United States Patent [19]
Bera et al.

[11] Patent Number: 5,747,732
[45] Date of Patent: May 5, 1998

[54] FIRE-RATED FURNITURE FEED POKE-THROUGH FITTING

[75] Inventors: John Bera, Kinnelon; John E. Kohaut, Port Murray, both of N.J.

[73] Assignee: Raceway Components, Inc., Paterson, N.J.

[21] Appl. No.: 306,962

[22] Filed: Sep. 16, 1994

Related U.S. Application Data

[63] Continuation of Ser. No. 967,703, Oct. 27, 1992, abandoned.

[51] Int. Cl.⁶ .................................................. H02G 3/28
[52] U.S. Cl. ............................................................... 174/48
[58] Field of Search ...................... 174/48, 49; 52/220.8

[56] References Cited

U.S. PATENT DOCUMENTS

| | | | |
|---|---|---|---|
| 4,323,724 | 4/1982 | Shine | 174/48 |
| 4,477,694 | 10/1984 | Kohaut | 174/48 |
| 4,770,643 | 9/1988 | Castellani et al. | 174/48 X |

*Primary Examiner*—Kristine L. Kincaid
*Assistant Examiner*—Dean A. Reichard
*Attorney, Agent, or Firm*—Fulwider, Patton, Lee & Utecht, LLP

[57] ABSTRACT

A poke-through fitting, adapted to feed a cable or cables therethrough to a piece of furniture, including a raceway extending through the fitting, and a top portion which includes a medial portion including a plurality of sides each adapted to normally close the fitting, and to enable an opening to be formed therein to enable egress of the cable or cables, adapted to enable the volume of the cable or cables passing therethrough to be substantially greater than the volume of a cable or cables adapted to pass through a standard furniture feed poke-through fitting.

The fitting is further adapted to be fire rated, including sealing elements, insulating elements, and radiating elements adapted to enable the fire-rating of the fire-rated floor to be substantially the same with or without the hole and fitting therein.

46 Claims, 4 Drawing Sheets

5,747,732

FIRE-RATED FURNITURE FEED POKE-THROUGH FITTING

This application is a continuation of application Ser. No. 07/967,703, filed Oct. 27, 1992, now abandoned.

BACKGROUND OF THE INVENTION

The invention relates generally to a fitting for passing a cable or cables through a floor, from a source of the cable or cables under the floor, to an outlet for the cable or cables, or to a device adapted to be activated by the cable or cables, above or at the floor. The invention relates specifically to a fire-rated furniture feed poke-through fitting.

It has been known to provide a fire-rated poke through fitting for a fire-rated concrete floor, which fitting is adapted to enable the fire-rating of the floor to be substantially the same with or without the hole and fitting therein, as disclosed, for example, in Kohaut U.S. Pat. No. 3,995,102 and Castellani et al. U.S. Pat. No. 4,770,643.

It has been further known to have a larger raceway for passing a cable or cables therethrough in a fitting adapted to be installed in a larger standard hole in the floor, for example, a fitting adapted to be installed in a standard hole having a nominal three-inch diameter may be adapted to have a larger raceway than a fitting adapted to be installed in a standard hole having a nominal two-inch diameter hole.

It has been further known to have a substantially flush outlet for the cable or cables passing through the fitting, such as a flush fitting having a top which extends above the floor substantially flush with the top of a carpet installed on the floor which top is adapted to enable cable or cables to exit therefrom, as disclosed in Castellani, et al., U.S. Pat. No. 4,770,643.

It has been further known to provide a fire-rated poke-through fitting adapted to enable the cable or cables passing therethrough to be fed to a piece of furniture such as a wall partition or desk. A furniture feed fitting generally refers to a device with a capacity for a large volume of cables, used to feed many desks, or to feed many cables to wall partitions which feed such cable or cables to many desks or computer work stations. Wall partitions generally are factory made, shipped in sections to be assembled at the job site, and create continuous raceways, fed at one or more points by a device such as a fire-rated furniture feed poke-through fitting.

However, the capacity for passing power electrical cable or cables, and/or non-power telephone, data, and/or other cable or cables through a known fire-rated furniture feed poke-through fitting, such as a flush furniture feed fitting, has been very limited. The ability of such known fittings to handle a large volume of cable or cables for office power, telephone, and/or data requirements has been very limited, in that the physical size of such cable or cables, including the aggregate thickness of the insulation about each cable in such large volume of cable or cables, is too great for the capacity of such known fittings.

Further, the volume of cable or cables adapted to pass through such known fittings is substantially less than that required for office power, telephone and/or data needs.

Still further, such larger volume of cable or cables required for the larger volume of office needs provides a substantially increased path for the transmission of heat and flame from a fire therethrough, which would compromise the fire-rating of the fitting, and would prevent the fitting from achieving a fire-rating for fire safety required to prevent endangering life and property.

SUMMARY OF THE INVENTION

The fitting of the invention is adapted to overcome the above problems, as well as others, associated with known fittings.

The fitting of the invention is adapted to enable a large volume of cable or cables to pass therethrough, to be fed to a piece of furniture, for connection thereby to, or connection thereto of, a device adapted to be activated thereby.

It includes an insert portion, adapted to fit in a hole formed in a floor, which insert portion includes a raceway extending therethrough, the diameter of which is substantially greater than the diameter of a raceway for known fire-rated furniture-feed fittings.

It further includes a top portion which includes a medial portion including a plurality of sides each adapted to normally close the fitting, and further adapted to enable an opening to be formed therein to enable egress of the volume of cable or cables from the fitting.

The fitting of the invention is further adapted to be fire-rated, to enable the fire rating of the floor with or without the hole in the floor and the fitting installed therein to be substantially the same, while enabling a large volume of cable or cables to be fed therethrough, which large volume of cable or cables would otherwise increase the transmission of heat and flame from a fire therethrough and compromise the fire-rating of the fitting.

It includes a plurality of elements for sealing the hole in the floor and the cable or cables passing through the fitting upon activation by heat and flame from a fire. It further includes elements for insulating the fitting from heat and flame from a fire, and elements for radiating heat from a fire.

DESCRIPTION OF THE PREFERRED EMBODIMENTS

The fitting 10 of the invention, in the preferred embodiment shown in the figures and described below, is adapted to be fire-rated, and to be installed in hole A adapted to be formed in a fire-rated floor B. Fitting 10 is further adapted to enable a cable or cables to be fed therethrough to an outlet in or at a piece of furniture such as a desk or wall partition.

Hole A adapted to be formed in a fire-rated floor B is preferably of substantially the same diameter, about three inches, as a hole formed in a fire-rated floor for a standard three-inch fitting.

Hole A has a wall C, and may be formed by core-drilling floor B. Floor B may be comprised of concrete.

Figure 4:
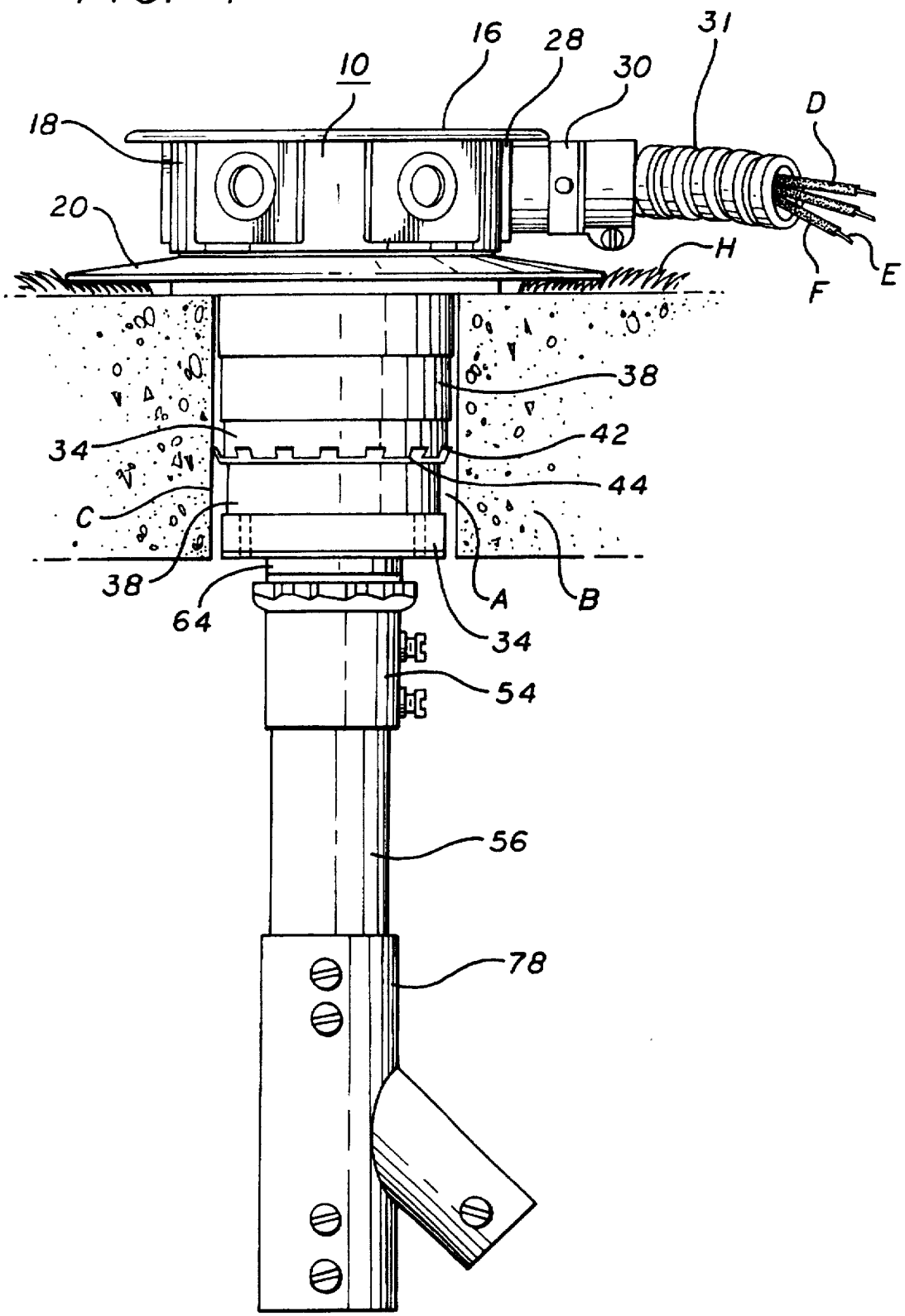
FIG. 4 is an elevational partly-sectional view of the poke-through fitting, installed in the floor, with power cables extending therethrough.

The cable or cables adapted to be fed through fitting 10 may comprise power, telephone, and/or data cables. Power cables D are shown in FIG. 4 exiting from fitting 10. Each cable D may include at least one wire E, and an insulating element F adapted to insulate and extend about wire E. Each communication cable (not shown) may include at least one wire, a shielding element adapted to shield and extend about the wire, and an insulting element adapted to insulate and extend about the shielding element. The shielding element may comprise a mesh shield comprised of metal.

The outlet for the cable or cables which are adapted to pass through fitting 10 is adapted to enable connection thereto of, or connection thereby to, a device or devices adapted to be activated thereby.

The device or devices adapted to be activated by the cable or cables adapted to pass through fitting 10 may comprise a desk lamps, telephones, computers, or the like.

Fitting 10 is further adapted to be fire-rated, such that the fire-rating of floor B in which fitting 10 is adapted to be installed is substantially the same with or without hole A and fitting 10 therein, for fire safety.

Fitting 10 is further adapted such that the volume of the cable or cables adapted to pass therethrough is greater than the volume of a cable or cables adapted to extend in the standard furniture feed poke-through fitting.

Fitting 10 includes a top portion 12, adapted to extend above floor B, an insert portion 14, adapted to be positioned in hole A, and elements for connecting top portion 12 to insert portion 14.

Top portion 12, as shown in FIGS. 1, 3, 4 and 5, is adapted to extend radially such that the diameter thereof is substantially greater than the diameter of hole A in floor B. Top portion 12 is further adapted to extend axially such that the height thereof is substantially greater than the height of a carpet H adapted to be mounted on floor B, and the height of the head of a standard flush fitting, and is substantially less than the height of the head of a standard pedestal fitting. The height of top portion 12 is preferably about two and one-half inches. Top portion 12 is further adapted to radiate heat at a temperature below that of combustion as defined by standards set by an independent testing laboratory.

Top portion 12 includes a top plate 16, a medial portion 18, and a bottom flange ring 20.

Top plate 16 is adapted to radiate heat from a fire, is comprised of metal, and is preferably about five and one-quarter inches in diameter.

Figure 1:
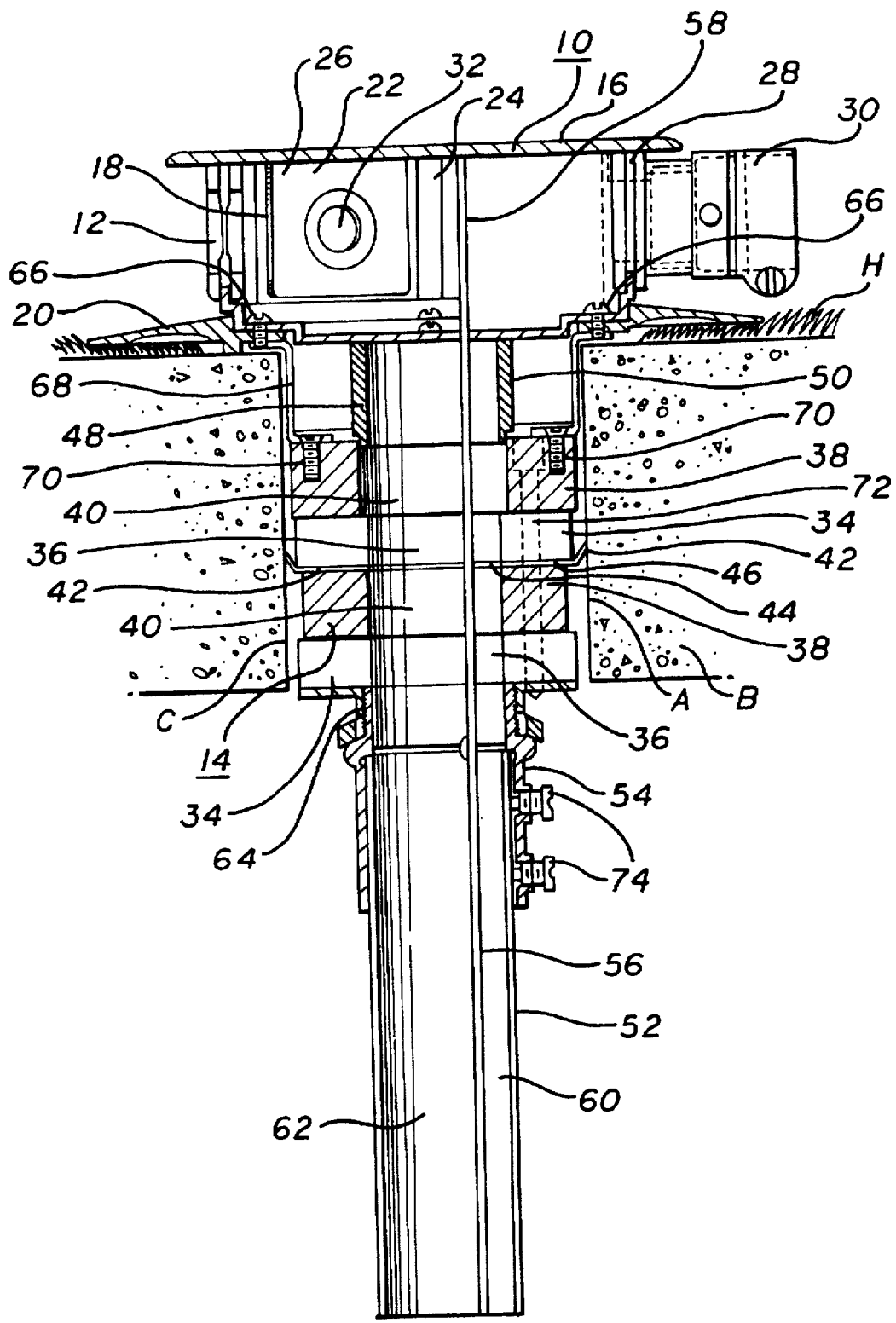
FIG. 1 is an elevational partly-sectional view of a fire-rated furniture feed poke-through fitting, pursuant to the invention, installed in a floor.
Figure 2:
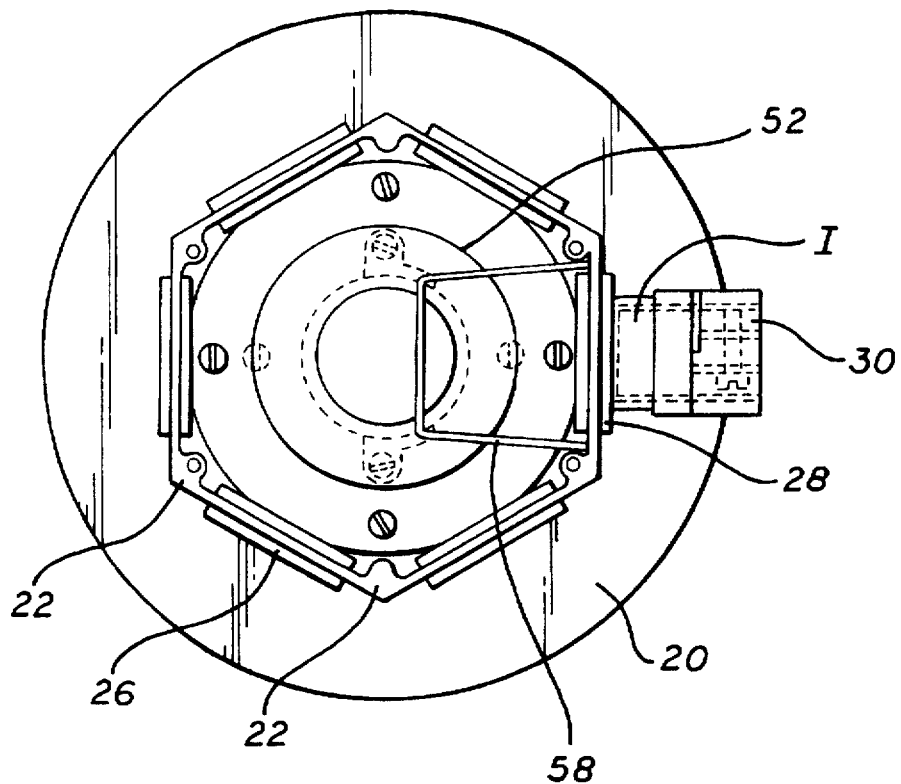
FIG. 2 is a top plan view of the poke-through fitting of the invention, without the top plate thereon.
Figure 3:
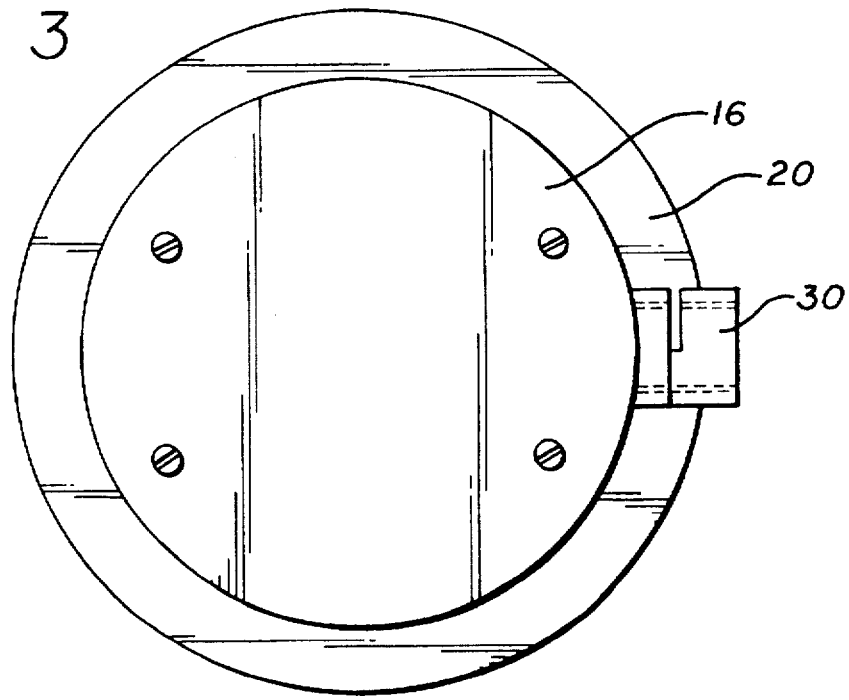
FIG. 3 is a similar view, with the top plate thereon.

Medial portion 18, as shown in FIGS. 1 and 2, is adapted to enable egress of the cable or cables from fitting 10. It includes a plurality of sides 22 extending axially generally parallel to the axial length of fitting 10. The cable or cables adapted to egress from medial portion 18 may comprise power, telephone, and/or data cables.

Medial portion 18 is preferably generally hexagonal-shaped in a plane transverse to the axial height thereof, and preferably includes six sides 22.

Each side 22 includes a frame 24, and elements adapted to be inserted in or removed from frame 24. The insertable elements include a plurality of grommets 26, each adapted to be inserted in or removed from frame 24, and a drop-in conduit adapter plate 28. Plate 28 includes an armor-clad cable connector 30 extending therefrom. Each grommet 26 includes a central portion 32 adapted to be slit by the person installing fitting 10, so as to form an opening in grommet 26, for egress therethrough of the cable or cables. Each grommet 26 is preferably comprised of silicone.

The opening adapted to be formed in central portion 32 in grommet 26 by the person installing fitting 10, to enable egress of the cable or cables therethrough, is further adapted to conform substantially to the diameter of the cable or cables adapted to pass therethrough. The diameter of the opening adapted to be formed in the central portion of grommet 26 is preferably not in excess of the diameter of the cable or cables adapted to egress therethrough by more than one eighth of an inch.

Drop-in plate 28 connector 30, as shown in FIGS. 2 and 4, may be inserted in the side 22 through which the power cable or cables egress from medial portion 18, such that flexible steel conduit 31 extends about and shields the power cable or cables egressing from fitting 10.

Bottom flange ring 20 is preferably about seven inches in diameter, and is preferably comprised of zamac material.

Figure 5:
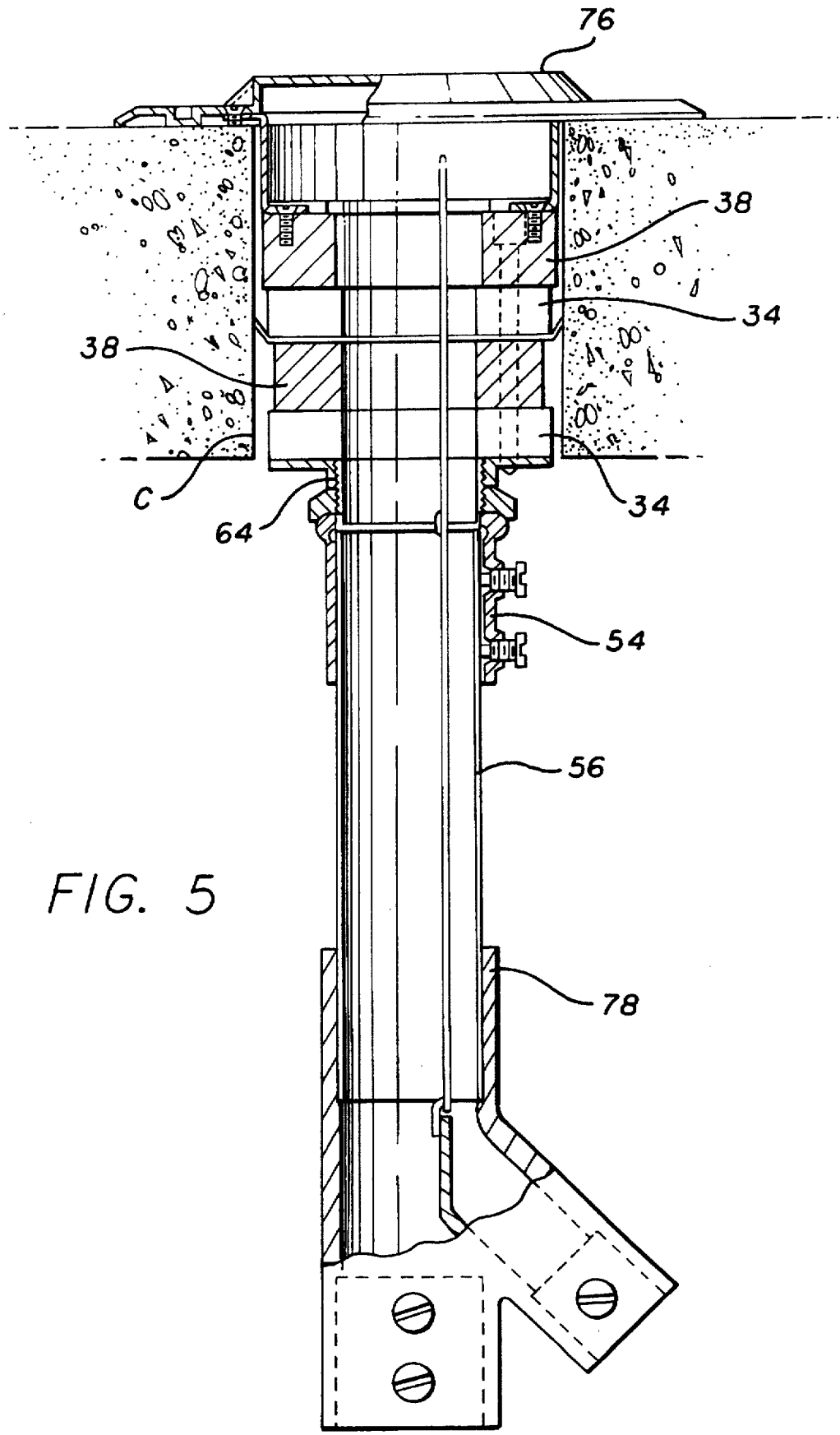
FIG. 5 is a similar view, with a disposable plate on the top portion of the poke-through fitting.

Insert portion 14, as shown in FIGS. 1, 4 and 5, includes fire transmission preventing elements, adapted to prevent transmission of heat and flame from a fire through fitting 10 and hole A in floor B, so as to enable the fire-rating of floor B to be substantially the same with or without hole A and fitting B therein.

The fire transmission preventing elements comprise elements adapted to seal hole A and the cable or cables passing through fitting 10 upon activation by heat and flame from a fire. In non-activated condition, the sealing elements are adapted to provide openings about insert portion 14 and about the cable or cables passing through fitting 10, upon inserting fitting 10 in hole A in floor B and passing the cable or cables therethrough. Upon activation, the sealing elements absorb heat, expand, and flow under pressure into the openings about insert portion 14, about the cable or cables passing therethrough, and in the spaces about the cable or cables formed by heat and flame from the fire which melts and burns the insulation off the cable or cables.

The fire transmission preventing elements further comprise elements adapted to insulate fitting 10 from heat and flame from a fire, and elements adapted to radiate heat from a fire.

The sealing elements comprise a plurality of disks 34, each having an opening 36 through which the cable or cables are adapted to pass. Each sealing disk 34 is preferably comprised of intumescent material.

The insulating elements comprise a plurality of disks 38, each having an opening 40 through which the cable or cables are adapted to pass. Each insulating disk 38 is adapted to absorb heat, cure, cross-link, emit water, and dissipate heat upon activation by heat and flame from a fire, and is preferably comprised of a phenolic material.

The radiating elements comprise top plate 16 and bottom flange ring 20 of top portion 12 of fitting 10, adapted to radiate heat at a temperature below that of combustion as defined by independent testing laboratory standards.

Insert portion 14 further includes an element adapted to enable fitting 10 to be inserted in hole A, and to retain fitting 10 in hole A upon exertion of increased upward pulling force.

The retainer element comprises a retainer disk 42, comprised of resilient material, having an opening 44 through which the cable or cables are adapted to pass. Retainer disk 42 has a plurality of resilient tabs 46 projecting from the periphery thereof at an upward angle relative to the plane of retainer disk 42, adapted to enable downward insertion of insert portion 14 into hole A in floor B, and further adapted to resiliently grip wall C of hole A and wedge and hold insert portion 14 fast in hole A upon exertion of increased upward fulling force thereon.

Insert portion 14, as shown in FIGS. 1, 4, and 5, further includes a cable passage enabling element, adapted to enable a cable or cables to pass through fitting 10 to an outlet, for connection thereto of, or for connection thereby to, a device adapted to be activated thereby. The volume of the cable or cables adapted to pass through the cable passage enabling element in fitting 10 is greater than the volume of the cable or cables adapted to pass through a standard furniture feed poke-through fitting.

The cable passage enabling element comprises a raceway 48, adapted to pass a greater volume of cable or cables therethrough than the volume of cable or cables adapted to pass through a standard three-inch flush furniture feed fitting.

Raceway 48 comprises an upper metal tube 50, at the upper end thereof, and opening 40 in insulating disks 38, openings 36 in sealing disks 34, and opening 44 in retainer disk 42.

The diameter of raceway 48 in fitting 10 is about one and three-eighths inches, and the diameter of the passage for cables in a standard furniture feed fitting is about three-quarters of an inch.

The volume of the cable or cables adapted to pass through raceway 48 is defined by the volume of the totality of the cable or cables adapted to pass therethrough.

The volume of the cable or cables adapted to pass through raceway 48 is dependent upon the maximum aggregate cross-section of copper conductors, which conduct heat to top portion 12 during a fire, the fire rating of the floor to be substantially the same with our without the hole and fitting therein. The maximum aggregate cross-section of copper conductors in fitting 10 is substantially equivalent to the greater of the volume of an aggregate cross-section of about one-thousand and fourteen ten-thousandths of a square inch, or dependent upon the size of copper conductor to be used in a particular system network about two-hundred number twenty-two cables, or about ten number twelve and one-hundred number twenty-two cables.

Fitting 10 further includes an extension tube 52, through which the cable or cables pass, which is preferably comprised of electrical mechanical tubing, and a coupling 54, adapted to connect extension tube 52 to insert portion 14.

Fitting 10 further includes a lower barrier 56, as shown in FIGS. 1 and 2, which extends axially through the length of extension tube 52 and coupling 54, an inserting barrier 56 which extends axially through the length of insert portion 14, and an upper barrier 58 which extends in top portion 12, so as to form a separate and isolated section 60 for power cables, and a separate and isolated section 62 for telephone, data, and the like non-power cables, therein. Upper barrier 56 and lower barrier 58 may be removable where only one type of cable or cables is used in fitting 10.

Fitting 10 further includes a bottom plate 64, adapted to enable connection thereto of sealing disks 34, insulating disks 38, and retainer disk 42.

Fitting 10 further includes screws 66, mounting strap 68, and screws 70 for connecting top portion 12 to insert portion 14, rivets 72 for securing sealing disks 34, insulating disks 38, retainer disk 42, and bottom plate 64 together, and screws 74 for connecting extension tube 52, bottom plate 64, and coupling 54 together. A disposable plate 76, as shown in FIG. 5, may be used for fitting 10 in non-activated condition. An abandonment plate (not shown) may be installed in fitting 10 at locations where cables are not to be fed therethrough. A conduit adapter 78, as shown in FIGS. 4 and 5, may be connected to extension tube 52.

To install fitting 10 in floor B, floor B may preferably be core-drilled to form a three-inch hole A having wall C, using a three-inch diameter core drill bit.

Fitting 10 may then be pushed into hole A, until the lowermost portion of bottom flange ring 20 of top portion 12 is seated on floor B. Resilient tabs 46 of retainer disk 42 in insert portion 14 flex radially inwardly upon downward insertion of fitting 10 in hole A, to enable fitting 10 to be pushed into hole A, and tabs 46 resiliently flex outwardly and grip wall C of hole A to retain fitting 10 in hole A.

Disposable plate 76 may be removed, and an activation kit, comprising medial portion 18 and bottom flange ring 20 of top portion 12, may then be installed, by screws 60 through flange ring 20 and mounting strap 66.

The cable or cables may then be pulled through raceway 48 of fitting 10, and through medial portion 18 of top portion 12. For telephone and/or data cable or cables, the installer may remove grommet 26 from frame 24, cut a slit in central portion 32 of grommet 26, run the cable or cables through the slit, and reinsert grommet 26 in frame 24. For power cable or cables, the installer may pull the cable or cables through the drop-in plate 28 connector 30 and flexible steel conduit 31, and insert into frame 24 the drop-in plate 28 connector 30 and flexible steel conduit 31 with the cable or cables extending therethrough. For use of fitting 10 to feed both power cables and telephone and/or data cable or cables, lower barrier 56 insert barrier 57 and upper barrier 58 are installed to separate and isolate the power cables from the telephone and/or data cables. Top plate 16 may then be secured to medial portion 18 of top portion 12.

The power cable or cables may be connected to a power receptacle in the wall partition, for connection of electrically-activated devices such as desk lamps thereto, telephone cable or cables may be connected to a telephone outlet in a wall partition for connection thereto of telephones at desks, and the data cable or cables may be connected to computers at desks.

In operation, upon the occurrence of a fire below floor B, heat and flame from the fire rise through hole A, activating the fire transmission preventing elements in fitting 10.

Sealing disks 34 absorb heat, and are activated to expand under pressure into the openings in hole A, about insulating disks 38, about insert portion 14, about wires E, and through wire insulation F. They form flexible foam seals, sealing openings and forming very strong refractory chars to form efficient heat and smoke barriers, retarding transmission of heat and flame from the fire.

Insulating disks 38 are activated to absorb heat, and to cure, cross-link, and emit water to dissipate heat in and about insert 10, and to provide increased openings about insert 10 for enabling increased expansion of sealing disks 34 upon activation by heat and flame from the fire to provide better insulation. Top portion 12 of fitting 10 radiates heat at a temperature below that of combustion as defined by standards set by an independent testing laboratory.

Upon the occurrence of the exertion of upward pulling force on insert 10 of fitting 12, through top portion 12, tabs 46 of retainer disk 42 grip wall C of hole A to hold fitting 10 fast in hole A, preventing the hazard of electrical shock and fire from exposed live ends of pulled-apart power wires.

Fitting 10 includes insert portion 14, adapted to fit in hole A formed in floor B, which includes raceway 48 extending therethrough, the diameter of which is substantially greater than the diameter of a raceway for known fire-rated furniture feed fittings. Raceway 48 is further adapted to enable an aggregate cross-section of copper conductors to pass therethrough, substantially greater than for known fire-rated furniture-feed fittings, while enabling the fire-rating of the floor to be substantially the same with or without the hole and fitting therein.

Fitting 10 further includes top portion 12 which includes medial portion 18 including a plurality of sides 22 each adapted to normally close fitting 10, and further adapted to enable an opening to be formed therein to enable egress of the large volume of cable or cables from fitting 10.

Fitting 10 is further adapted to be fire-rated, to enable the fire rating of floor B with or without the hole A and fitting 10 therein to be substantially the same, while enabling a large volume of cable or cables to be fed therethrough, which large volume of cable or cables would otherwise increase the transmission of heat and flame from a fire therethrough and compromise the fire-rating of the fitting.

Fitting 10 further includes a plurality of sealing disks 34 for sealing hole A and the cable or cables passing through fitting 10 upon activation by heat and flame from a fire. It further includes insulating disks 38 for insulating fitting 10 from heat and flame from a fire, and top plate 16 and bottom flange ring 20 of top portion 12 for radiating heat at a temperature below that of combustion as defined by independent testing laboratory standards.

Preferred embodiments of the invention have been set forth above, for the purpose of explaining the invention. However, it is to be understood that variations in such embodiments may be within the scope and spirit of the invention as set forth in the claims.

We claim:

1. A poke-through service fitting, adapted to be installed in an opening formed at a selected location in a floor, for enabling source service cables, positioned below the floor, to pass through the fitting, for activation of services by the service cables, and for retarding the transmission of heat and flame from a fire through the floor opening and fitting to the floor, comprising:

(a) an insert, for insertion in the floor opening, and for retarding the transmission of heat and flame from a fire through the floor opening and the fitting to the floor;

(b) a service head, adapted to be connected to the insert and to extend above the floor, which includes a plurality of sides, greater than four, each facing outwardly, in which each side includes an outlet, for enabling one of the service cables to pass therethrough, for activation of services by the service cables; and (c) means for connecting the service head to the insert.

2. A fitting as in claim 1, in which the insert includes fire transmission retarding means for sealing the floor opening and the service cables upon activation thereof by the heat and flame from a fire, adapted, in non-activated condition, to provide openings about the insert and about the service cables passing through the fitting, upon inserting the fitting in the floor opening and passing the cables therethrough, and further adapted, upon activation, to absorb heat, expand, and flow under pressure into the openings about the insert portion, about the service cables passing therethrough, and in spaces about the service cables formed by the heat and flame from the fire which melts and burns insulation off the service cables.

3. A fitting as in claim 1, in which the service head is adapted to extend radially outwardly such that the diameter is substantially greater than the diameter of the floor opening, and is further adapted to extend axially such that the height is substantially greater than the height of a carpet adapted to be mounted on the floor, and is substantially less than the height of the service head of a prior three-inch fitting.

4. A fitting as in claim 1, in which the service head includes a bottom flange ring.

5. A fitting as in claim 1, in which the height of the service head is about two and one-half inches.

6. A fitting as in claim 1, in which the insert includes means for sealing the floor opening and the fitting upon activation by a fire.

7. A fitting as in claim 1, in which the insert includes fire transmission preventing means for insulating the fitting upon occurrence of a fire.

8. A fitting as in claim 1, in which the insert includes fire transmission preventing means for radiating heat from the fitting upon occurrence of a fire, at a temperature below that of combustion as defined by standards set by an independent testing laboratory.

9. A fitting as in claim 1, in which the outlets each comprise a frame, a plate, adapted to be inserted in or removed from the frame, having an opening therein, and a connector, secured to the plate so as to extend about the opening in the plate and extend from the plate.

10. A fitting as in claim 1, in which at least one of the sides of the service head is adapted to enable one of the service cables to pass therethrough to connect to the outlet separate from the fitting, for activation by the one of the service cables of the separate service outlet.

11. A fitting as in claim 1, in which a volume of the service cables adapted to pass through the fitting is defined by a volume of copper conductors adapted to pass through the fitting, and the volume of service cables adapted to pass through the fitting is substantially equivalent to the volume of about ten number twelve and one-hundred number twenty-two cables.

12. A fitting as in claim 1, in which the number of sides is six.

13. A fitting as in claim 1, in which the service head is generally hexagonal-shaped in generally horizontal cross-section.

14. A fitting as in claim 1, in which the services are adapted to be fed to the outlets for activation thereof, and in which the service outlets are adapted to be mounted in a furnishing.

15. A fitting as in claim 1, in which the insert includes means for retarding the transmission of heat and flame from a fire through the floor opening and the fitting to the floor, comprising an element comprised of fire retarding material.

16. A fitting as in claim 15, in which the fire retarding material comprises means for sealing the floor opening and the cables upon activation thereof by the heat and flame from a fire, adapted, in non-activated condition, to provide an opening about the insert portion and about the cables passing through the fitting, upon inserting the fitting in the floor opening and passing the cables therethrough, and further adapted, upon activation, to absorb heat, expand, and flow under pressure into the openings about the insert portion, about the cables passing therethrough, and in spaces about the cables formed by the heat and flame from the fire which melts and burns insulation off the cables.

17. A fitting as in claim 15, in which the fire transmission retarding means include means for sealing the floor opening and the fitting upon activation by a fire.

18. A fitting as in claim 15, in which the fire transmission retarding means include means for insulating the fitting upon occurrence of a fire.

19. A fitting as in claim 15, in which the fire transmission retarding means include means for radiating heat from the fitting upon occurrence of a fire, at a temperature below that of combustion as defined by standards set by an independent testing laboratory.

20. A fitting as in claim 1, in which the service head includes a substantial volume for passing the cables therethrough, and in which the insert includes a raceway for passing the cables therethrough.

21. A fitting as in claim 20, in which a volume of service cables adapted to pass through the fitting is defined by a volume of copper conductors adapted to pass through the fitting, and the volume of service cables adapted to pass through the fitting is substantially equivalent to an aggregate cross-section of about one-thousand and fourteen ten-thousandths of a square inch.

22. A fitting as in claim 20, in which a volume of service cables adapted to pass through the fitting is defined by a volume of copper conductors adapted to pass through the fitting, and the volume of service cables adapted to pass through the fitting is substantially equivalent to the volume of about two-hundred number twenty-two cables.

23. A fitting as in claim 20, in which the floor opening comprises a nominal three inch opening, the fitting comprises a three inch fitting, and the diameter of the insert raceway is about one and three-eighths inches.

24. A fitting as in claim 1, in which the outlets each comprise a frame, and egress enabling means comprising means, normally closed, adapted to enable an opening to be formed therein for passing one of the service cables therethrough, and further adapted to be inserted in or removed from the frame.

25. A fitting as in claim 24, in which the normally closed means comprise a grommet, adapted to enable an opening to be formed therein by the person installing the fitting, such that the opening adapted to be formed therein conforms substantially to the diameter of the service cable adapted to pass therethrough.

26. A fitting as in claim 25, in which the opening adapted to be formed in the grommet is adapted not to exceed the diameter of the service cable by more than one-eighth of an inch.

27. A fitting as in claim 1, in which the service head includes a medial portion comprising a plurality of sides extending axially generally parallel to the axial length of the fitting.

28. A fitting as in claim 27, in which the medial portion of the service head is generally hexagonal-shaped in a plane transverse to the axial height thereof.

29. A fitting as in claim 27, in which the plurality of sides of the medial portion of the service head comprise six sides.

30. A fitting as in claim 1, further comprising conduit adapted to be connected to the outlets so as to extend about the service cables upon egress thereof from the fitting.

31. A fitting as in claim 1, in which the fitting further comprises means for isolating the source service cables therein.

32. A fitting as in claim 31, in which the isolating means comprise a barrier adapted to extend axially substantially through the length of the fitting.

33. A fitting as in claim 32, in which the barrier is further adapted to be removable from the fitting.

34. A fitting as in claim 1, in which the service head includes a top plate.

35. A fitting as in claim 34, in which the top plate is about five and one-quarter inches in diameter.

36. A fitting as in claim 4, in which the flange ring is about seven inches in diameter.

37. A poke-through service fitting, adapted to be installed in an opening formed at a selected location in a floor, for enabling source service cables, positioned below the floor, to pass through the fitting for activation of services by the service cables, and for retarding the transmission of heat and flame from a fire through the floor opening and fitting to the floor, comprising:

(a) an insert, for insertion in the floor opening, and for retarding the transmission of fire through the floor opening and the fitting to th e floor; and (b) a service head, adapted to be connected to the insert and to extend above the floor, which includes a plurality of sides, each facing outwardly, in which each side includes an outlet, for enabling one of the service cables to pass therethrough, for activation of services by the service cables, in which the outlets each comprise a frame, and means, normally closed, adapted to enable an opening to be formed therein for passing a service cable therethrough, and further adapted to be inserted in or removed from the frame.

38. A fitting as in claim 37, in which the normally closed means comprise a grommet, adapted to enable an opening to be formed therein by the person installing the fitting, such that the opening adapted to be formed therein conforms substantially to the diameter of the service cable adapted to pass therethrough.

39. A fitting as in claim 38, in which the opening adapted to be formed in the grommet is adapted not to exceed the diameter of the service cable by more than one-eighth of an inch.

40. A poke-through service fitting, adapted to be installed in an opening formed at a selected location in a floor, for enabling source service cables, positioned below the floor, to pass through the fitting for connection to service outlets for the service cables separate from the fitting, for activation of services by the service cables at the outlets, and for retarding the transmission of heat and flame from a fire through the floor opening and fitting to the floor, comprising:

(a) an insert, f or insertion in the floor opening, and for retarding the transmission of fire through the floor opening and the fitting to the floor;

(b) a service head, adapted to be connected to the insert and to extend above the floor, which includes a plurality of sides, each facing outwardly, in which each side includes an outlet, for enabling one of the service cables to pass therethrough, for connection to a service outlet for the service cable separate from the fitting, for activation of services by the service cable at the separate service outlet; and (c) means for connecting the service head to the insert.

41. A system for activating services, for enabling source service cables, positioned below a floor, to pass through a fitting adapted to be installed in an opening formed at a selected location in the floor, for connection to a service outlet for service cables separate from the fitting, for activation of services by the service cables at a service outlet, comprising:

(a) an outlet for the services; and (b) a service fitting, adapted to be installed in the opening formed at the selected location in the floor, for enabling the service cables to pass therethrough for connection to the outlet, for activation of services by the service cables at the service outlet, including a service head, adapted to extend above the floor, which includes a plurality of sides, greater than four, each facing outwardly, in which each side includes a service cable outlet for enabling one of the service cables to pass therethrough;

(c) in which the service outlet is separate from the service cable outlets in the fitting service head.

42. A system as in claim 41, in which the service head includes a substantial volume for passing the cables therethrough, and in which the fitting further comprises an insert, for insertion in the floor opening, to which the service head is adapted to be connected, which insert includes a raceway for passing the cables therethrough, and in which the fitting further comprises means for connecting the service head to the insert.

43. A system as in claim 44, in which the service cable outlets each comprise a frame, and means, normally closed, adapted to enable an opening to be formed therein for passing a service cable therethrough, and further adapted to be inserted in or removed from the frame.

44. A system as in claim 41, in which the fitting includes an insert, for insertion in the floor opening, and for retarding the transmission of heat and flame from a fire through the floor opening and the fitting to the floor, including means for retarding the transmission of heat and flame from a fire through the floor opening and the fitting to the floor, comprising an element comprised of fire retarding material, and in which the fitting further comprises means for connecting the service head to the insert.

45. A system as in claim 41, in which the service outlet is adapted to be mounted in a furnishing.

46. A system as in claim 44, in which the fitting further comprises means for isolating the source service cables therein.

* * * * *